(12) United States Patent
Satsuka (10) Patent No.: US 11,694,421 B2
(45) Date of Patent: Jul. 4, 2023

(54) IMAGE PROCESSING APPARATUS, IMAGE READING APPARATUS, IMAGE FORMING APPARATUS, AND IMAGE PROCESSING METHOD

(71) Applicant: Akifumi Satsuka, Kanagawa (JP)

(72) Inventor: Akifumi Satsuka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/093,668

(22) Filed: Nov. 10, 2020

(65) Prior Publication Data

US 2021/0149607 A1 May 20, 2021

(30) Foreign Application Priority Data

Nov. 19, 2019 (JP) .............................. JP2019-209026

(51) Int. Cl.
*G06F 15/00* (2006.01)
*G06V 10/143* (2022.01)
(Continued)

(52) U.S. Cl.
CPC .......... *G06V 10/143* (2022.01); *G06F 3/1208* (2013.01); *G06F 3/1241* (2013.01);
(Continued)

(58) Field of Classification Search
CPC . G06F 3/1208; G06T 7/90; G06T 7/97; G06T 2207/10048
(Continued)

(56) References Cited

U.S. PATENT DOCUMENTS 5,617,187 A * 4/1997 Hayashi ............... G03G 21/046
250/271
5,689,347 A 11/1997 Naoi
(Continued)

FOREIGN PATENT DOCUMENTS

CN 101031016 A 9/2007
CN 102396214 A 3/2012
(Continued)

OTHER PUBLICATIONS

Chinese Office Action dated Feb. 7, 2022, in corresponding Chinese Application No. 202011291370.7, 21 pp.
(Continued)

*Primary Examiner* — Mark R Milia
(74) *Attorney, Agent, or Firm* — Xsensus LLP (57) ABSTRACT

An image processing apparatus includes an acquiring unit and an assigning unit. The acquiring unit is configured to acquire first image information on a first image and second image information on a second image read by irradiating, with light at respective different wavelengths for read, a printing medium on which at least the first image and the second image to be irradiated with light at different wavelengths to read are mixed. The assigning unit is configured to assign image information on one or more color systems constituting the first image information and image information on one or more color systems constituting the second image information to any of communication paths for supplying image information to a subsequent stage image processing unit configured to perform predetermined image processing on the first image information and the second image information.

14 Claims, 6 Drawing Sheets

(51) Int. Cl.
  *G06F 3/12* (2006.01)
  *G06T 7/00* (2017.01)
  *G06T 7/90* (2017.01)
  *G06V 10/20* (2022.01)

(52) U.S. Cl.
  CPC .................. *G06T 7/90* (2017.01); *G06T 7/97* (2017.01); *G06V 10/20* (2022.01); *G06T 2207/10048* (2013.01)

(58) Field of Classification Search
  USPC ......................................................... 358/2.1
  See application file for complete search history.

(56) References Cited

U.S. PATENT DOCUMENTS

| | | | |
|---|---|---|---|
| 7,432,492 | B2 | 10/2008 | Kikuchi |
| 7,659,532 | B2 | 2/2010 | Kikuchi |
| 8,599,446 | B2 | 12/2013 | Akimoto et al. |
| 8,964,207 | B2 | 2/2015 | Akimoto et al. |
| 9,294,651 | B2 | 3/2016 | Okada et al. |
| 2007/0205355 | A1 | 9/2007 | Kikuchi |
| 2008/0304703 | A1 | 12/2008 | Kikuchi |
| 2011/0205601 | A1 | 8/2011 | Akimoto et al. |
| 2011/0261425 | A1* | 10/2011 | Yamaguchi .......... H04N 1/1017 358/512 |
| 2012/0127543 | A1 | 5/2012 | Okada et al. |
| 2012/0257231 | A1 | 10/2012 | Akazawa |
| 2014/0055811 | A1* | 2/2014 | Akimoto ............ H04N 1/00867 358/1.14 |
| 2018/0124268 | A1 | 5/2018 | Satsuka |
| 2019/0384523 | A1 | 12/2019 | Nagumo et al. |

FOREIGN PATENT DOCUMENTS

| | | |
|---|---|---|
| JP | 2001-523900 A | 11/2001 |
| JP | 2008-040873 | 2/2008 |
| JP | 2009-224873 A | 10/2009 |
| JP | 2012-222447 A | 11/2012 |
| JP | 2016-219988 | 12/2016 |
| JP | 2019-012892 | 1/2019 |
| WO | 99/04368 A1 | 1/1999 |

OTHER PUBLICATIONS

Notice of Allowance dated Oct. 9, 2022 in Chinese Patent Application No. 202011291370.7, 7 pages.

* cited by examiner

IMAGE PROCESSING APPARATUS, IMAGE READING APPARATUS, IMAGE FORMING APPARATUS, AND IMAGE PROCESSING METHOD

CROSS-REFERENCE TO RELATED APPLICATIONS

The present application claims priority under 35 U.S.C. § 119 to Japanese Patent Application No. 2019-209026, filed on Nov. 19, 2019. The contents of which are incorporated herein by reference in their entirety.

BACKGROUND OF THE INVENTION

1. Field of the Invention

The present invention relates to an image processing apparatus, an image reading apparatus, an image forming apparatus, and an image processing method.

2. Description of the Related Art

In recent years, a printing medium on which an image that is irradiated with visible light to read and an image that is irradiated with non-visible light to read, such as near infrared light (NIR), are printed has been known. In addition, Japanese Unexamined Patent Application Publication No. 2019-12892 discloses an image processing apparatus that performs image processing on a menu image including a visible light component and a non-visible light component.

However, to enable image processing on the image that is read with non-visible light, it is necessary to newly arrange an image processing system for an image that is irradiated with non-visible light to read, in addition to an image processing system for an image that is irradiated with visible light to read. To cope with this, it is necessary to make large additions and modifications to an existing image processing system that reads an image by irradiating the image with visible light.

SUMMARY OF THE INVENTION

According to an aspect of the present invention, an image processing apparatus includes an acquiring unit and an assigning unit. The acquiring unit is configured to acquire first image information on a first image and second image information on a second image read by irradiating, with light at respective different wavelengths for read, a printing medium on which at least the first image and the second image to be irradiated with light at different wave lengths to read are mixed. The assigning unit is configured to assign image information on one or more color systems constituting the first image information and image information on one or more color systems constituting the second image information to any of communication paths for supplying image information to a subsequent stage image processing unit configured to perform predetermined image processing on the first image information and the second image information.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide an image processing apparatus, an image reading apparatus, an image forming apparatus, and an image processing method that are able to process a first image to be read with light at a first wavelength and a second image to be read with light at a second wavelength different from the first wavelength from a printing medium in which the first image and the second image are mixed, without making large additions and modifications to an existing image processing unit.

Embodiments of a multifunction peripheral (MFP) to which an image processing apparatus, an image processing method, an image reading apparatus, and an image forming apparatus are applied will be described below.

First Embodiment

Hardware Configuration of MFP

Figure 1:
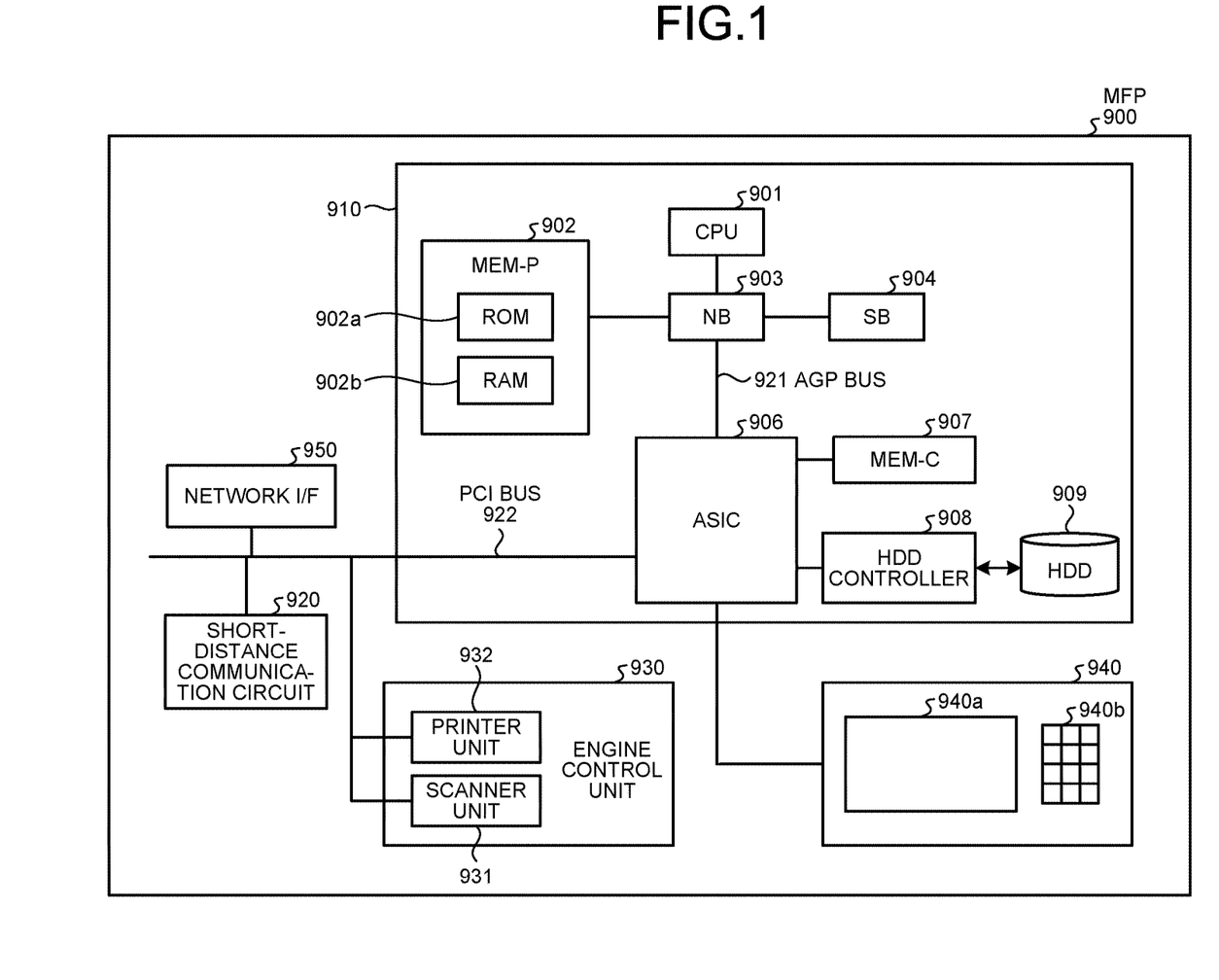
FIG. 1 is a block diagram of a multifunction peripheral (MFP) of a first embodiment.

FIG. 1 is a diagram illustrating a hardware configuration of an MFP 900. As illustrated in FIG. 1, the MFP 900 includes a controller 910, a short-distance communication circuit 920, an engine control unit 930, an operation panel 940, and a network interface (I/F) 950.

The controller 910 includes a central processing unit (CPU) 901, a system memory (MEM-P) 902, a north bridge (NB) 903, a south bridge (SB) 904, an application specific integrated circuit (ASIC) 906, a local memory (MEM-C) 907, a hard disk drive (HDD) controller 908, and an HDD 909. The NB 903 and the ASIC 906 are connected by an accelerated graphics port (AGP) bus 921.

The CPU 901 is a control unit that controls the entire MFP 900. The NB 903 is a bridge for connecting the CPU 901, the MEM-P 902, the SB 904, and the AGP bus 921. The NB 903 includes a memory controller for controlling read and write with respect to the MEM-P 902, a peripheral component interconnect (PCI) master, and an AGP target.

The MEM-P 902 includes a read only memory (ROM) 902a that is a memory for storing a program or data to implement each of functions of the memory controller, and a random access memory (RAM) 902b that is used as a memory for loading the program or the data, a drawing memory for memory printing, or the like. Meanwhile, the program stored in the RAM 902b may be provided by being recorded in a computer readable recording medium, such as a compact disc (CD)-ROM, a CD-recordable (CD-R), or a digital versatile disk (DVD), in a computer-installable or a computer-executable file format.

The SB 904 is a bridge for connecting the NB 903, a PCI device, and a peripheral device. The ASIC 906 is an integrated circuit (IC) used for image processing including a hardware element for image processing, and has a function as a bridge to connect the AGP bus 921, a PCI bus 922, the HDD controller 908, and the MEM-C 907 to one another.

The ASIC 906 includes a PCI target, an AGP master, an arbiter (ARB) that is a central core of the ASIC 906, and a memory controller that controls the MEM-C 907. Further, the ASIC 906 includes a plurality of direct memory access controllers (DMACs) that rotate an image by using hardware logic or the like, and a PCI unit that transfers data to a scanner unit 931 and a printer unit 932 via the PCI bus 922. It may be possible to connect a universal serial bus (USB) interface or an institute of electrical and electronics engineers 1394 (IEEE 1394) to the ASIC 906.

The MEM-C 907 is a local memory for use as a copy image buffer and a symbol buffer. The HDD 909 is a storage for accumulating image data, for accumulating font data used at the time of printing, and for accumulating a form. The HDD 909 controls write and read of data with respect to the HDD 909 under the control of the CPU 901. The AGP bus 921 is a bus interface for a graphics accelerator card that is introduced to accelerate graphics processing. The AGP bus 921 allows direct access to the MEM-P 902 at high throughput to thereby accelerate operation of the graphics accelerator card.

The short-distance communication circuit 920 is a communication circuit for a near-field communication (NFC), Bluetooth (registered trademark), or the like. Further, the engine control unit 930 includes the scanner unit 931 and the printer unit 932.

The operation panel 940 includes a display unit 940a, such as a touch panel, that displays a current setting value, a selection screen, or the like and receives input from an operator. The operation panel 940 further includes an operating unit 940b that includes a numeric keypad for inputting a setting value of a condition on image formation, such as a density setting condition, a start key for giving an instruction to start copying, and the like.

The controller 910 controls the entire MFP 900, and performs, for example, drawing control, communication control, input processing from the operation panel 940, and the like. The scanner unit 931 or the printer unit 932 has an image processing function to perform error diffusion processing, gamma conversion processing, or the like.

Meanwhile, the MFP 900 is able to execute a document box function, a copier function, a printer function, and a facsimile function by sequentially switching the functions from one another by an application switching key of the operation panel 940. The MFP 900 enters a document box mode when the document box function is selected, and enters a copier mode when the copier function is selected. Further, the MFP 900 enters a printer mode when the printer function is selected, and enters a facsimile machine mode when the facsimile machine function is selected.

The network I/F 950 is an interface for performing data communication using a communication network 100. The short-distance communication circuit 920 and the network I/F 950 are electrically connected to the ASIC 906 via the PCI bus 922.

Configuration of Main Part of MFP

Figure 2:
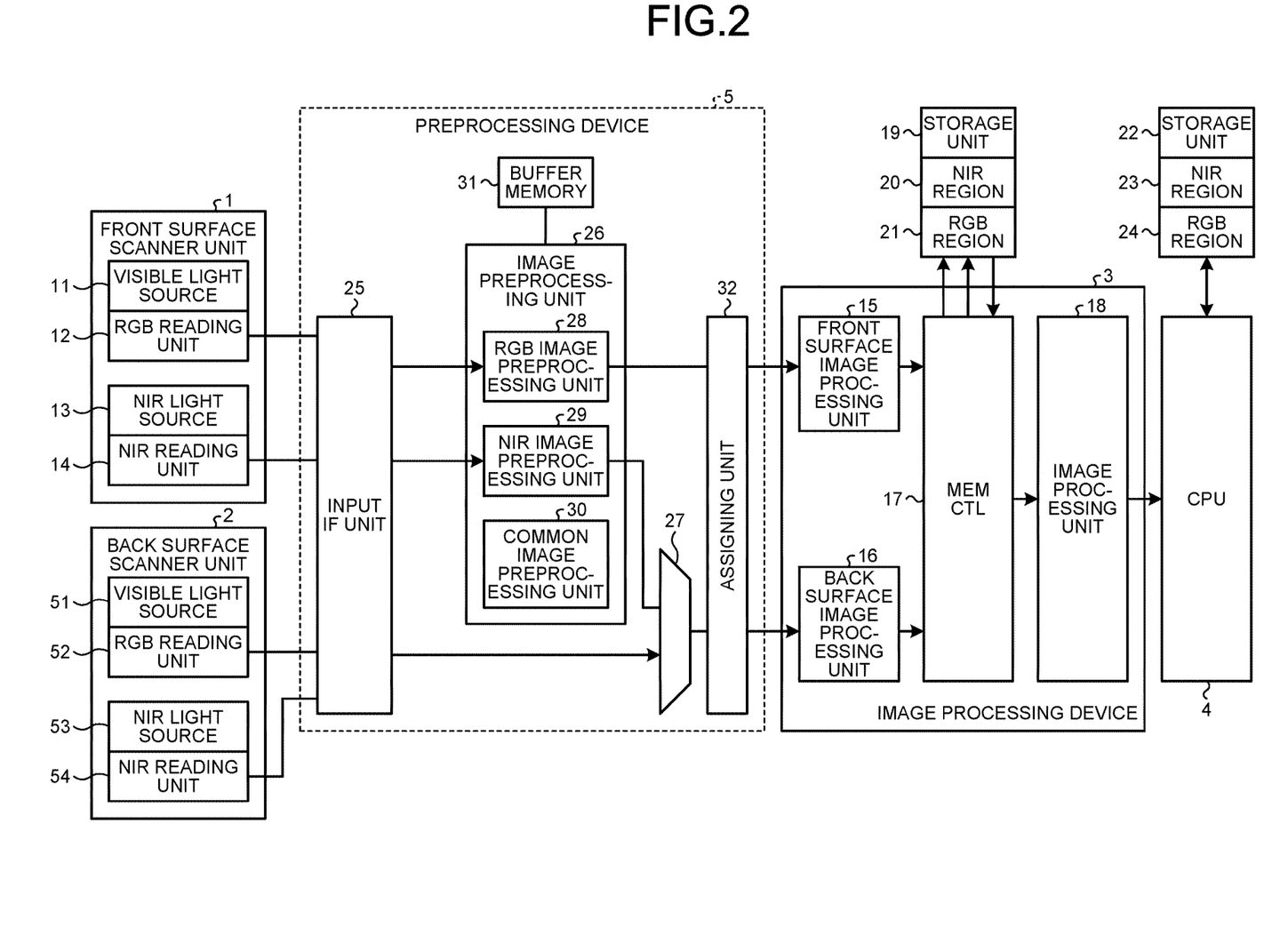
FIG. 2 is a block diagram illustrating a main part of the MFP of the first embodiment.

FIG. 2 is a diagram illustrating a configuration of a main part of the MFP 900. As illustrated in FIG. 2, the MFP 900 includes, as the configuration of the main part, a front surface scanner unit 1, a back surface scanner unit 2, an image processing device 3, a CPU 4, a preprocessing device 5, a storage unit 19, and a storage unit 22.

Configuration of Scanner Unit

The front surface scanner unit 1 and the back surface scanner unit 2 correspond to the scanner unit 931 illustrated in FIG. 1. The front surface scanner unit 1 reads a front surface of a printing medium. The back surface scanner unit 2 reads a back surface of the printing medium. The back surface scanner unit 2 includes a visible light source 51, an RGB reading unit 52, an NIR light source 53, and an NIR reading unit 54.

The front surface scanner unit 1 includes a visible light source 11 that irradiates the front surface of the printing medium with visible light, and an RGB reading unit 12 that separately reads light of red (R), light of green (G), and light of blue (B) from reflected light that is obtained by irradiating the printing medium with visible light. As the visible light source 11, a light source that emits light at a wavelength of about 360 nanometers (nm) to 630 nm may be used, for example.

Meanwhile, it may be possible to arrange a CMY reading unit that separately reads light of cyan (C), light of magenta (M), and light of yellow (Y) from reflected light that is obtained by irradiating the printing medium with visible light, instead of the RGB reading unit 12. Further, it may be possible to arrange an OGV reading unit that separately reads light of orange (O), light of green (G), and light of violet (V) from reflected light that is obtained by irradiating the printing medium with visible light, instead of the RGB reading unit 12. In other words, it is possible to arrange an arbitrary reading unit as long as the reading unit performs read using visible light.

Further, the front surface scanner unit 1 includes a an NIR light source 13 that irradiates the front surface of the printing medium with NIR light that is one example of non-visible light, and an NIR reading unit 14 that reads an image for non-visible light on the basis of reflected light that is obtained by irradiating the printing medium with non-visible light. Meanwhile, in this example, the NIR light is used as the "non-visible light", but it may be possible to use completely non-visible light or light in a slightly visible wavelength range. For example, light at a wavelength of 780 nm to 2500 nm may be used as the near infrared light, but the light at a wavelength of 780 nm to 830 nm is a light in a visible wavelength range. It may be possible to use, as the near infrared light, the light in the visible wavelength range as described above.

Figure 3:
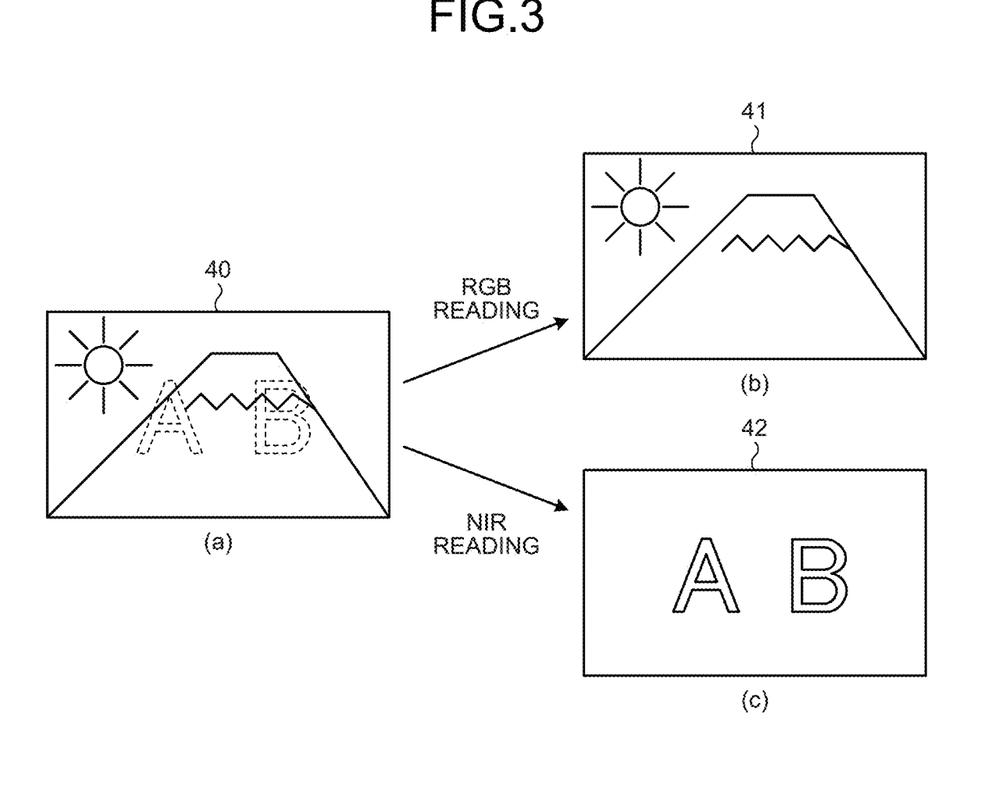
FIG. 3 is a diagram illustrating a printing medium that is read by the MFP of the first embodiment.

FIG. 3 illustrates one example of a printing medium 40 that is read by the front surface scanner unit 1. FIG. 3 illustrates, at (a), the printing medium 40 on which an image that is irradiated with visible light to read and an image that is irradiated with non-visible light (for example, NIR light) to read are mixed. In FIG. 3, images of a "mountain" and a "sun" are one example of the image read with visible light, and characters "AB" indicated by dotted lines are one example of the image read with NIR light.

The back surface scanner unit 2 includes a visible light source that irradiates the front surface of the printing medium with visible light, and an RGB reading unit that separately reads light of red (R), light of green (G), and light of blue (B) from reflected light that is obtained by irradiating the printing medium with visible light.

Meanwhile, in this example, both of the front surface scanner unit 1 and the back surface scanner unit 2 are arranged to make it possible to simultaneously read both surfaces of the printing medium. However, it may be possible to arrange a single scanner unit, firstly reads one surface of a printing medium, invert the printing medium by an inverting mechanism, and read the other surface to achieve reading of both surfaces.

Further, explanation will be continued based on the assumption that the front surface scanner unit 1 and the back surface scanner unit 2 are arranged, but it may be possible to adopt a configuration in which only the front surface scanner unit 1 is arranged. Even in this case, it is possible to perform processing on both of the image for visible light and the image for non-visible light on the printing medium by using an existing image processing device that is arranged in a subsequent stage as will be described later.

Configuration of Image Processing Device

The image processing device 3, the CPU 4, the storage unit 19, and the storage unit 22 are existing hardware for processing images that are read from the front surface and the back surface of the printing medium irradiated with visible light. The image processing device 3 corresponds to the ASIC 906 illustrated in FIG. 1, and the CPU 4 corresponds to the CPU 901 illustrated in FIG. 1. Further, the storage unit 19 and the storage unit 22 correspond to the RAM 902b (may be the ROM 902a or the HDD 909) illustrated in FIG. 1.

The image processing device 3 includes a front surface image processing unit 15, a back surface image processing unit 16, a storage control unit (MEMCTL) 17, and an image processing unit 18. The front surface image processing unit 15 performs predetermined image processing, such as magnification change processing, on an image that is read from the front surface of the printing medium by the front surface scanner unit 1. The back surface image processing unit 16 performs predetermined image processing, such as magnification change processing, on an image that is read from the back surface of the printing medium by the back surface scanner unit 2.

The storage control unit 17 controls write of a front surface image and a back surface image, which are subjected to the predetermined image processing by the front surface image processing unit 15 and the back surface image processing unit 16, in the storage unit 19 in units of pages, and further controls read of the images in units of pages. Specifically, the storage unit 19 includes an NIR region 20 that is a storage region for an image read with non-visible light (NIR image: one example of a second image), and an RGB region 21 that is a storage region for an image read with visible light (RGB image: one example of a first image). Further, as will be described later, the image read with visible light is supplied to the storage control unit 17 via the front surface image processing unit 15, and the image read with non-visible light is supplied to the storage control unit 17 via the back surface image processing unit 16.

The storage control unit 17 causes the image read with visible light to be stored in the RGB region 21 of the storage unit 19, and causes the image read with non-visible light to be stored in the NIR region 20 of the storage unit 19. Further, the storage control unit 17 causes the images stored in the RGB region 21 and the NIR region 20 of the storage unit 19 to be read alternately and supplied to the image processing unit 18, for example. The image processing unit 18 performs predetermined image processing on the image that is read with visible light and that is obtained from the RGB region 21, so that a visible image is generated. Further, the image processing unit 18 performs predetermined image processing on the image that is read with non-visible light and that is obtained from the NIR region 20, so that a visible image is generated. Each of the images is stored in the RGB region 21 or the NIR region 20 of the storage unit 22 by the CPU 4, and read and displayed by a monitor device or the like, for example.

Configuration of Preprocessing Device

The preprocessing device 5 is arranged by being inserted and connected between the image processing device 3, which is an existing hardware as described above, and each of the scanner units 1 and 2. The preprocessing device 5 includes an input interface unit (input IF unit) 25, an image preprocessing unit 26, a selector 27, a buffer memory 31, and an assigning unit 32.

The input IF unit 25 is one example of an acquiring unit, acquires the RGB image and the NIR image from the from surface scanner unit 1, and acquires the RGB image from the back surface scanner unit 2. The image preprocessing unit 26 includes an RGB image preprocessing unit 28 (one examples of a first image preprocessing unit), an NIR image preprocessing unit 29 (one example of a second image preprocessing unit), and a common image preprocessing unit 30.

The RGB image preprocessing unit 28 performs, on the RGB image, image processing of removing the image (in this example, the characters of "AB") that is to be read with NIR light and that is mixed in the RGB image read with visible light as illustrated at (a) in FIG. 3, and thereafter supplies the RGB image to the assigning unit 32. With this configuration, as illustrated at (b) in FIG. 3, it is possible to supply an RGB image 41, in which the image to be read with NIR light is removed, to the assigning unit 32.

The NIB image preprocessing unit 29 performs, on the NIR image, image processing of removing the image (in this example, the images of the "mountain" and the "sun") that are to be read with visible light and that are mixed in the NIR image read with NIR light, and thereafter supplies the NIR image to the assigning unit 32. With this configuration, as illustrated at (c) in FIG. 3, it is possible to supply an NIR image 42, in which the images to be read with visible light are removed, to the assigning unit 32.

The common image preprocessing unit 30 performs, on the RGB image and the NIR image, image preprocessing, such as magnification change processing of changing printing magnification, which is common to both of the images.

In the MFP 900 of the first embodiment, the NIR image is processed in a processing line for a back surface image in the existing image processing device 3. Therefore, the selector 27 outputs the NIR image from the NIR image preprocessing unit 29 and the RGB image from the back surface scanner unit 2 in a switching manner.

Figure 4:
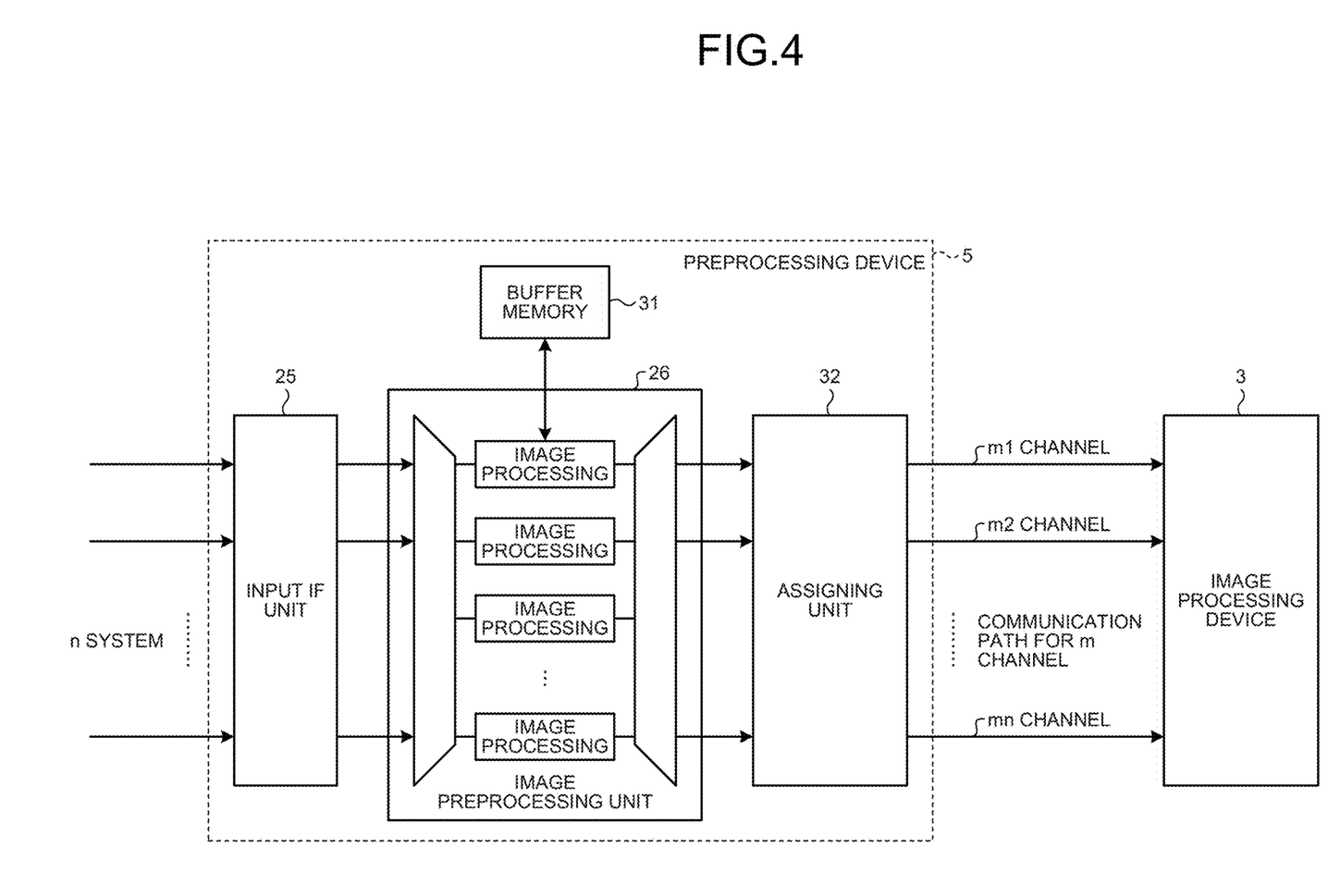
FIG. 4 is a schematic block diagram of the main part of the MFP of the first embodiment.

The assigning unit 32 assigns image information on each of the RGB image and the NIR image to an existing communication path for supplying the image information to the image processing device 3, and outputs the image information as will be described later. In other words, in this example, the number of channels on the input side (n systems) increases as illustrated in FIG. 4 (n>m) because processing on the NIR image is performed in addition to processing on the RGB image. Therefore, the assigning unit 32 assigns each piece of image information to each of the communication paths of the image processing device 3 such that the number of channels on the input side is adjusted to the number of channels of the existing image processing device 3 (the number of communication paths: m1 to mn in the example in FIG. 4). With this configuration, it becomes possible to perform image processing on the NIR image by using the exiting image processing apparatus as it is (without any addition or modification).

Meanwhile, if the number of channels on the input side (the number of color systems) is smaller than the number of channels (the number of communication paths) of the image processing device 3 (n<m), buffering in the buffer memory 31 (one example of a storage unit) is performed at the time of image processing, and thereafter data transmission as performed.

Image Processing Operation

Figure 5:
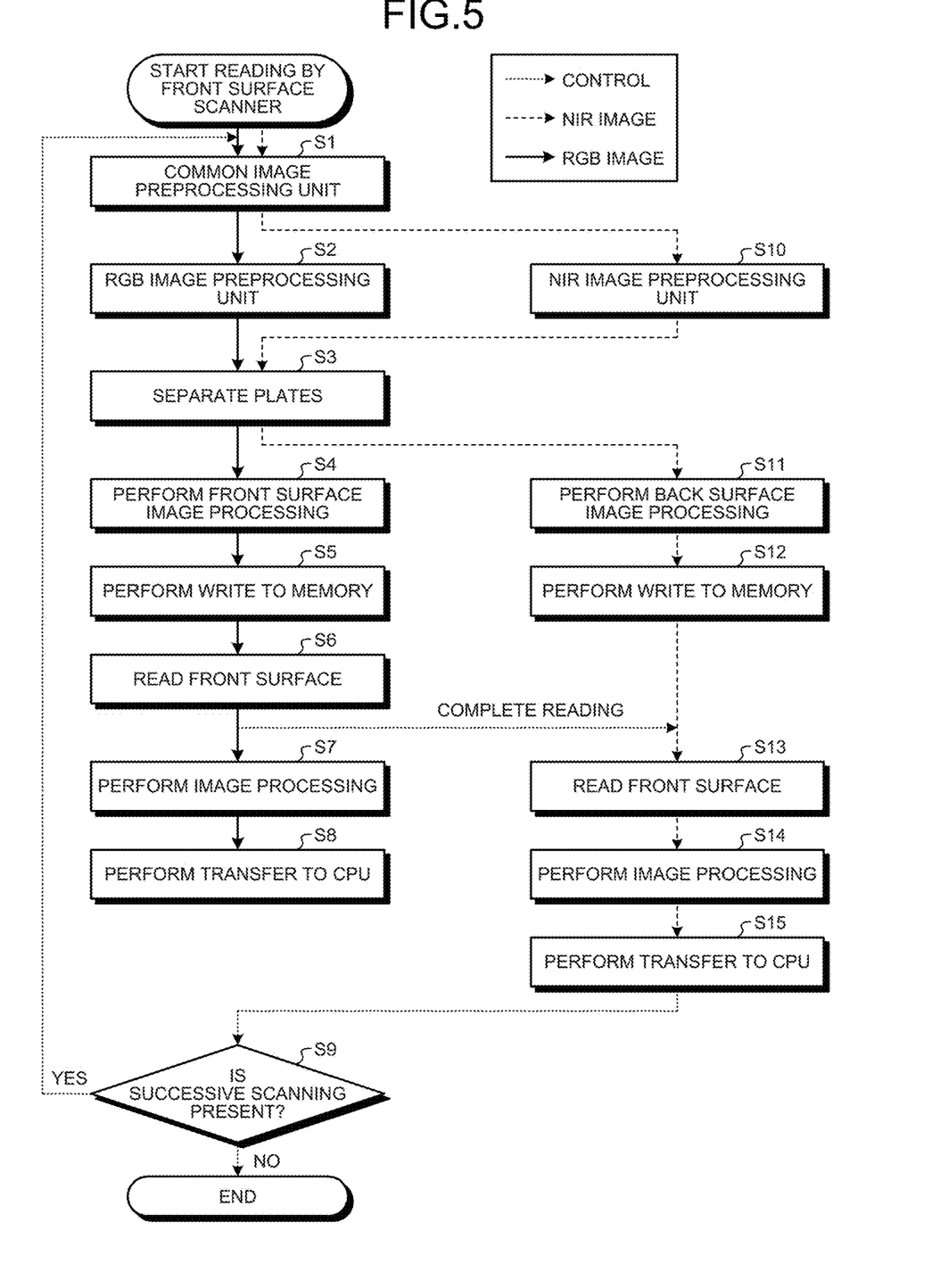
FIG. 5 is a flowchart illustrating the flow of image forming operation performed by the MFP of the first embodiment.

Operation of reading the RGB image and the NIR image as described above will be described below with reference to a flowchart in FIG. 5. First, the front surface scanner unit 1 simultaneously turns on visible light and NIR light for the front surface of the printing medium (or may turn on the light with certain time difference).

If the visible light source 11 and the NIR light source 13 for the front surface of the printing medium are turned on, the front surface of the printing medium 40 in which the image for visible light and the image for non-visible light are mixed as illustrated at (a) in FIG. 3 are read, for example. Then, an RGB image read by the visible light source 11 and an NIR image read by the NIR light source 13 are formed.

The RGB image is supplied, as image information on a total of three color systems, such as an image of an R color system, an image of a G color system, and an image of a B color system, to the input IF unit 25. Further, the NIR image is supplied, as image information on a single color system, to the input IF unit 25. That is, the input IF unit 25 acquires information on a total of four color systems (system n=4), where the three systems correspond to the RGB image and the one system corresponds to the NIR image (four systems=three systems+one system).

The input IF unit 25 supplies the RGB image and the NIR image to the image preprocessing unit 26. Meanwhile, it may be possible to allow selection of whether to perform image processing on the RGB image and the NIR image, and supply the RGB image and the NIR image to the image preprocessing unit 26 if needed.

The common image preprocessing unit 30 of the image preprocessing unit 26 performs, on the RGB image and the NIR image, image processing, such as shading correction processing or inter-line correction processing of adjusting pieces of image information on the channels in units of lines, which is common to the RGB image and the NIR image (Step S1).

The RGB image preprocessing unit 28 of the image preprocessing unit 26 performs, on the RGB image, image processing of removing an NIR image component (Step S2). With this process, the RGB image in which the NIR image component is removed is generated as illustrated at (b) in FIG. 3.

The NIR image preprocessing unit 29 of the image preprocessing unit 26 performs, on the NIR image, image processing of removing an RGB image component (Step S10). With this process, the NIR image in which the RGB image component is removed is generated as illustrated at (c) in FIG. 3.

The RGB image from the back surface scanner unit 2 and the NIR image from the NIR image preprocessing unit 29 are supplied to the selector 27 of the preprocessing device 5. The selector 27 selects and outputs the NIR image when the front surface of the printing medium 40 is to be processed, and selects and outputs the RGB image read by the back surface scanner unit 2 when the back surface of the printing medium 40 is to be processed.

In the MFP 900 of the first embodiment, the RGB image is processed in an image processing line for the front surface, and the NIR image is processed in an image processing line for the back surface. Therefore, the assigning unit 32 assigns, to communication paths of two channels included in the image processing device 3, pieces of image information on a total of four color systems, such as the RGB image that is formed of the three color systems and that is supplied from the RGB image preprocessing unit 28 and the NIR image that is formed of the single color system (Step S3). Specifically, the assigning unit 32 assigns the RGB image to a communication path for the front surface image processing unit 15 in a time-sharing manner, and assigns the NIR image to a communication path for the back surface image processing unit 16.

With this configuration, it is possible to change assignment of the image information on each of the color systems in accordance with physical imitation (the number of output channels) applied to the image processing device 3 in the subsequent stage. Therefore, it is possible to construct a scanner system including a new kind of image, such as invisible information (embedded image or the like), without making any change, such as additions or modifications, on the image processing device 3 in the subsequent stage.

Further, in the existing image processing device 3, the RGB image for the front surface and the RGB image for the back surface are simultaneously input to the image processing line for the front surface and the image processing line for the back surface. Similarly, in the MFP 900 of the first embodiment, the RGB image is input to the image processing line for the front surface and the NIR image is input to the image processing line for the back surface. Therefore, it is possible to perform image processing on the RGB image and the NIR image as in the conventional manner, without changing a processing timing for the image processing line for the front surface, a processing timing for the image processing line for the back surface, and the like.

Furthermore, resolution is different between the NIR image as invisible information and the RGB image as visible information, so that noise resistance increases or decreases. In other words, the RGB image can be obtained as information at a certain signal level when the RGB image is read, but a signal level of information on the NIR image when the NIR image is read is lower than the signal level of the RGB image. Therefore, the NIR image is information that is more vulnerable to the noise than the RGB image.

However, in the MFP 900 of the first embodiment, the NIR image is subjected to image processing in the image processing line for the NIR image (the image processing line for the back surface) separately from the RGB image. Therefore, it is possible to perform processing for information at a low signal level, such as processing of reducing noise at relatively high intensity, on the NIR image, so that it is possible to form an NIR image with good image quality.

Meanwhile, it may be possible to assign a plurality of systems or a single system to each of changes (each of the communication paths) of the image processing device 3. Further, if the number n of color systems is larger than the number m of channels, the assigning unit 32 assigns pieces of image information on the n systems to a channel m1, a channel m2, . . . , a channel mn, respectively, as illustrated in FIG. 4. In contrast, if the number n of the color systems is smaller than the number m of the channels, buffering in the buffer memory 31 is performed at the time of image preprocessing, and thereafter an assignment process is performed.

Subsequently, the image processing device 3 causes The front surface image processing unit 15 to perform front surface image processing on the RGB image (Step S4), and thereafter temporarily stores the RGB image in the RGB region 21 of the storage unit 19 (Step S5). Further, the image processing device 3 causes the front surface image processing unit 15 to perform back surface image processing on the NIR image (Step S11), and thereafter temporarily stores the NIR image in the NIR region 20 of the storage unit 19 (Step S12).

The storage control unit 17 reads the RGB image or the NIR image from the RGB region 21 or the NIR region 20 in order of the RGB image and the NIR image (Step S6 and Step S13). The image processing unit 18 forms the RGB image to be displayed as illustrated at (b) in FIG. 3 and the NIR image to be displayed as illustrated at (c) in FIG. 3 on the basis of the RGB image and the NIR image that are sequentially read from the storage unit 19, for example (Step S7 and Step S14), and transmits the RGB image and the NIR image to the CPU 4 (Step S8 and Step S15). The CPU 4 temporarily stores the RGB image and the NIR image in an RGB region 24 or an NIR region 23 of the storage unit 22, and reads and outputs the images at display timings or the like, for example.

If successive scanning is present (YES at Step S9), processes from Step S1 to Step S15 are repeated. If scanning is completed (NO at Step S9), she entire process of the flowchart in FIG. 5 is terminated. As a control procedure, control of simultaneously reading the front surface and the back surface of the printing medium 40, storing the read information in the storage unit 19, and sequentially reading and outputting the information is performed. With this configuration, it is possible to transfer an image through exactly the same control procedure as the conventional one.

Effects of First Embodiment

As is clear from the description above, the MFP 900 of the first embodiment causes the preprocessing device 5 to assign the number of inputs from the scanner 1 (the number of color systems as described above) such that the number of inputs is adjusted to the number of channels (the number of communication paths) of the existing image processing device 3. With this configuration, it is possible to construct a scanner system including a new kind of image, such as invisible information (embedded image or the like) without making any change, such as additions or modifications, to the existing image processing device 3.

Second Embodiment

Figure 6:
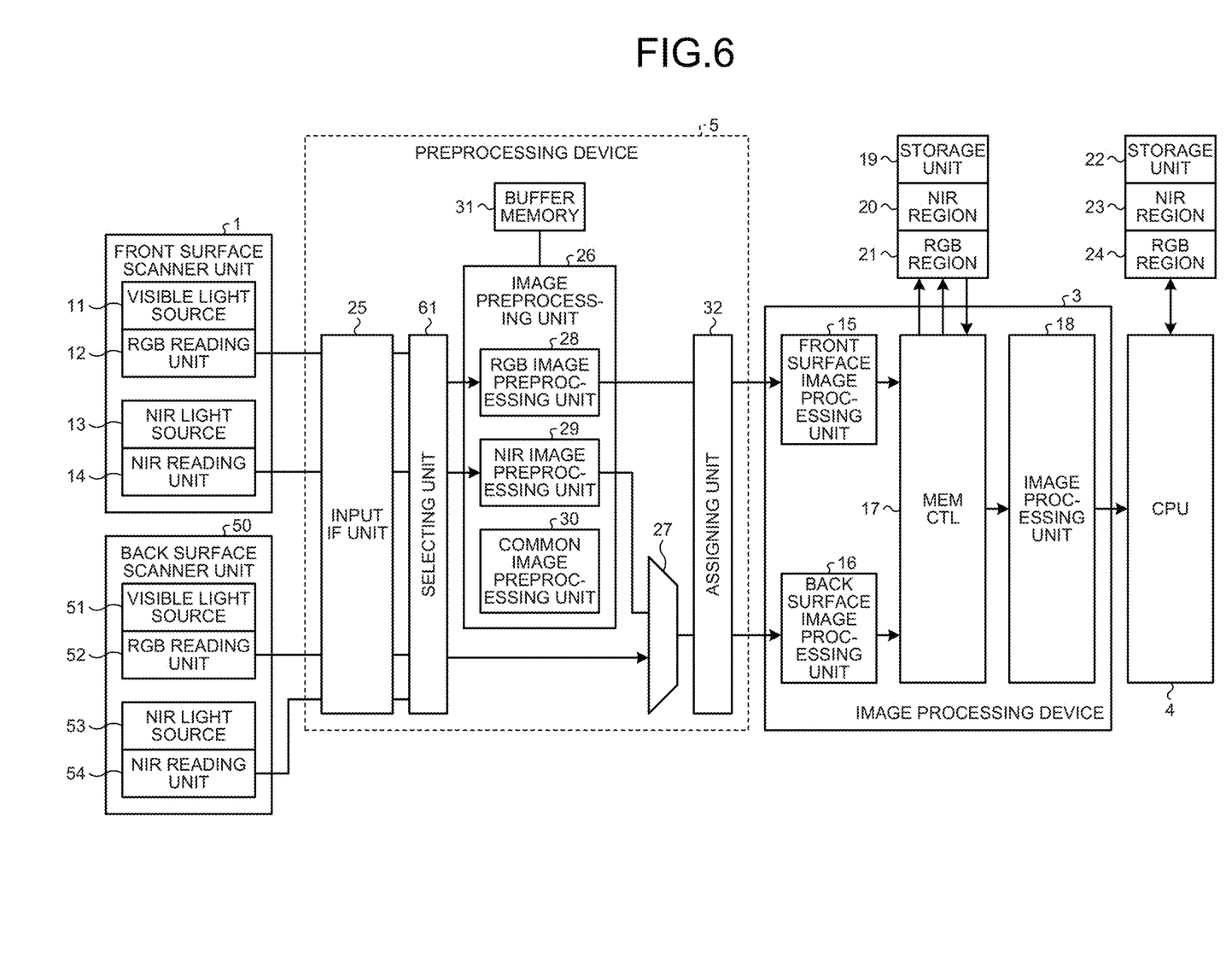
FIG. 6 is a block diagram illustrating a main part of an MFP of a second embodiment.

An MFP according to a second embodiment will be described below. The MFP of the second embodiment is an example in which both of a front surface scanner and a back surface scanner are able to read an RGB image and an NIR image. FIG. 6 is a block diagram of a main part of the MFP of the second embodiment as described above. As can be seen in FIG. 6, the MFP of the second embodiment is configured such that a back surface scanner unit 50 includes a visible light source 51, an RGB reading unit 52, an NIR light source 53, and an FIR reading unit 54, similarly to the front surface scanner unit 1.

Further, in the MFP of the second embodiment, the preprocessing device 5 includes a selecting unit 61 that selects image information on each of the color systems received from the input IF unit 25, and supplies the selected image information to the image preprocessing unit 26 or the selector 27.

Meanwhile, the MFP of the second embodiment is different from the first embodiment as described above in that the back surface scanner unit 50 includes the NIR light source 53, an NIR reading unit 54, and the selecting unit 61. Therefore, only the difference as described above will be described below. Further, in FIG. 6, components that perform the same operation as that of the MFP of the first embodiment as described above are denoted by the same reference symbols, and detailed explanation thereof will be omitted.

Specifically, in the MFP of the second embodiment, the visible light source 11 of the front surface scanner unit 1, the NIR light source 13 of the front surface scanner unit 1, the visible light source 51 of the back surface scanner unit 50, and the NIR light source 53 of the back surface scanner unit 50 are caused to turn on simultaneously or with a certain time differences. With this configuration, an RGB image and an NIR image on the front surface of the printing medium and an RGB image (one example of third image information) and an NIR image (one example of fourth image information) on the back surface are read and supplied to the input IF unit 25. The input IF unit 25 supplies the pieces of image information as described above to the selecting unit 61.

The selecting unit 61 temporarily stores, in the buffer memory 31, the RGB image and the NIR image on the front surface and the RGB image and the NIR image on the back surface. Then, the selecting unit 61 firstly reads the RGB image and the NIR image on the from surface from the buffer memory 31 and supplies the images to the image preprocessing unit 26, and thereafter, reads the RGB image and the NIR image on the back surface from the buffer memory 31 and supplies the images to the image preprocessing unit 26. Meanwhile, it may be possible to read, from the buffer memory 31, the image information on the back surface and the image information on the front surface in this order.

With this configuration, as described above, image processing by the image preprocessing unit 26 and the process of assigning channels to the image processing device 3 by the assigning unit 32 are performed on the RGB image and the NIR image on the front surface and the RGB image and the NIR image on the back surface in this order, so that it is possible to achieve the same effects as those of the first embodiment.

According to an embodiment, it is possible to process a first image to be read with light at a first wavelength and a second image to be read with light at a second wavelength different from the first wavelength from a printing medium in which the first image and the second image are mixed, without making large additions and modifications to an existing image processing unit.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:
    acquiring circuitry configured to acquire first image information on a first image read by irradiating a printing medium with first light from a first light source and second image information on a second image read by irradiating the printing medium with second light of different wavelengths than the first light from a second light source, the second light source being different from the first light source, the printing medium including at least the first image and the second image are mixed; and
    assigning circuitry configured to assign image information on one or more color systems constituting the first image information and image information on one or more color systems constituting the second image information to any of communication paths for supplying image information to subsequent stage image processing circuitry configured to perform predetermined image processing on the first image information and the second image information,
    wherein:
    the subsequent stage image processing circuitry includes:
        front surface image processing circuitry configured to perform front surface image processing on the first image information obtained by reading the first image printed on a front surface of the printing medium; and
        back surface image processing circuitry configured to perform back surface image processing on back surface image information obtained by reading a back surface image printed on a back surface of the printing medium, the back surface image processing circuitry being separate from the front surface image processing circuitry, and
    the assigning circuitry is configured to assign the image information on the one or more color systems constituting the first image information to a first communication path configured to supply image information to the front surface image processing circuitry, and assign the image information on the one or more color systems constituting the second image information to a second communication path configured to supply image information to the back surface image processing circuitry, the first communication path being separate from the second communication path.

2. The image processing apparatus according to claim 1, further comprising:
    a memory to store the first image information on the first image and the second image information on the second image acquired by the acquiring circuitry,
    wherein the assigning circuitry is configured to assign the image information on the one or more color systems constituting the first image information and the image information on the one or more color systems constituting the second image information stored in the memory to any of the communication paths.

3. The image processing apparatus according to claim 1, further comprising:
    first image preprocessing circuitry configured to perform image preprocessing of removing the second image information, on the first image information acquired by the acquiring circuitry; and
    second image preprocessing circuitry configured to perform image preprocessing for the back surface of the printing medium, on the second image information.

4. The image processing apparatus according to claim 3, wherein:
    the acquiring circuitry is configured to acquire, in addition to the first image information and the second image information, third image information on a third image and fourth image information on a fourth image read by irradiating, with light at respective different wavelengths for read, a printing medium on which at least the third image and the fourth image to be irradiated with light at different wave lengths to read are mixed, and
    the image processing apparatus further comprising a selecting circuitry configured to select and output the first image information, the second image information, the third image information, and the fourth image information so as to supply the first image information to the first image preprocessing circuitry, supply the second image information to the second image preprocessing circuitry, and supply the third image information and the fourth image information to the assigning circuitry.

5. The image processing apparatus according to claim 4, wherein:
    the first image information and the second image information are collectively read by a reader for the front surface of the printing medium, and the third image information and the fourth image information are collectively read by a reader for the back surface of the printing medium.

6. The image processing apparatus according to claim 4, wherein:
the first image information and the third image information are read by irradiating the printing medium with visible light, and
the second image information and the fourth image information are read by irradiating the printing medium with non-visible light.

7. The image processing apparatus according to claim 4, wherein the third image information includes image information on color systems of red, green, and blue.

8. The image processing apparatus according to claim 1, wherein:
the first image information is read by irradiating the printing medium with visible light, and
the second image information is image information read by irradiating the printing medium with non-visible light.

9. The image processing apparatus according to claim 8, wherein the non-visible light is infrared light.

10. The image processing apparatus according to claim 1, wherein the first image information includes image information on color systems of red, green, and blue.

11. An image reading apparatus comprising:
the image processing apparatus according to claim 1;
the first light source;
the second light source;
a first reader to read the first image from the printing medium irradiated with the light at a first wavelength; and
a second reader to read the second image from the printing medium irradiated with the light at a second wavelength.

12. An image forming apparatus comprising:
an image former configured to form the first image based on the first image information supplied via a communication path of the communication paths, and form the second image based on the second image information supplied via a communication path of the communication paths; and
the image reading apparatus according to claim 11.

13. The image processing apparatus according to claim 1, further comprising:
a selector configured to select one of the back surface image information and the second image information to be output to the back surface image processing circuitry.

14. An image processing method comprising:
acquiring first information on a first image read by irradiating a printing medium with first light from a first light source and second image information on a second image read by irradiating the printing medium with second light of different wavelengths than the first light from a second light source, the second light source being different from the first light source, the printing medium including at least the first image and the second image mixed; and
assigning image information on one or more color systems constituting the first image information and image information on one or more color systems constituting the second image information to any of communication paths for supplying image information to subsequent stage image processing circuitry configured to perform predetermined image processing on the first image information and the second image information,
wherein:
the assigning includes assigning the image information on the one or more color systems constituting the first image information to a first communication path configured to supply image information to front surface image processing circuitry configured to perform front surface image processing on the first image information obtained by reading the first image printed on a front surface of the printing medium, and assigning the image information on the one or more color systems constituting the second image information to a second communication path configured to supply image information to back surface image processing circuitry configured to perform back surface image processing on back surface image information obtained by reading a back surface image printed on a back surface of the printing medium, the first communication path being separate from the second communication path.

* * * * *